Nov. 12, 1929.　　　　D. STENHOUSE　　　　1,735,551
GLASS DELIVERING APPARATUS
Filed July 23, 1924
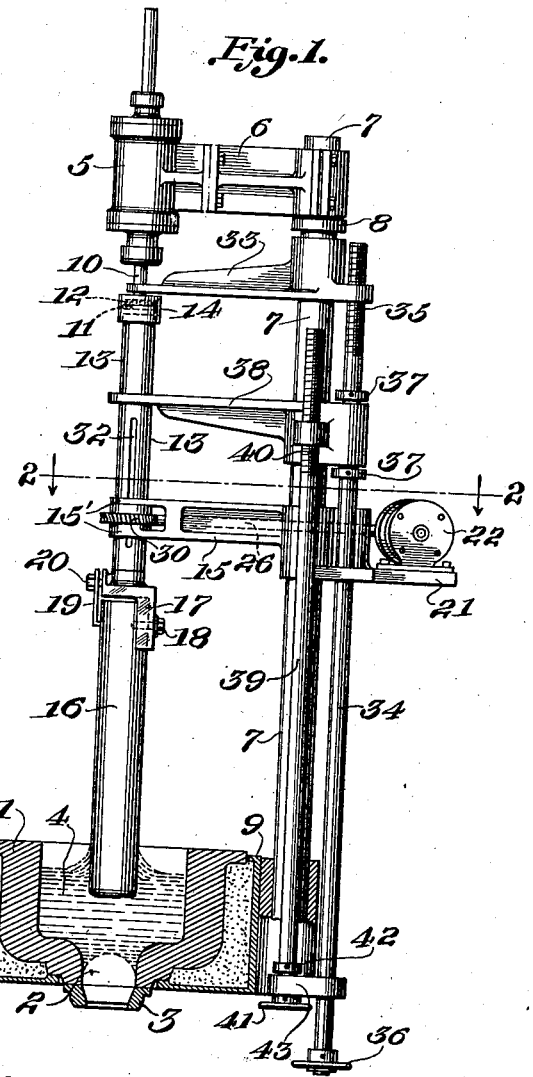
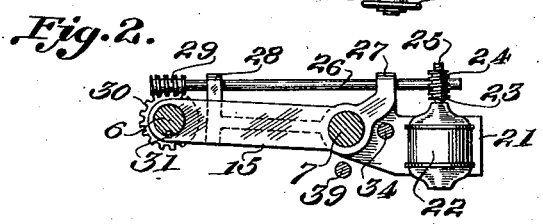
Inventor
David Stenhouse
By Eccleston + Eccleston
Attorneys Patented Nov. 12, 1929

1,735,551

UNITED STATES PATENT OFFICE

DAVID STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

GLASS-DELIVERING APPARATUS

Application filed July 23, 1924. Serial No. 727,734.

The invention relates generally to a means for delivering glass to machines for the manufacture of glass articles, and more particularly the invention relates to a means by which the glass, as delivered to the forming apparatus, will be of uniform temperature.

Another object of the invention is to operate the usual plunger in such a manner that the plunger itself will always have a uniform temperature.

The common practice of feeding glass to forming machines consists in allowing the glass to flow from the furnace to the flow spout, which is provided with an orifice in its bottom through which the glass flows to the forming machines. A vertically reciprocable plunger is mounted in the flow spout in alignment with the flow orifice, and as the plunger reciprocates parisons or gobs of glass of measured quantities are intermittently fed to the forming devices in the well known manner. This is the usual method of delivering glass which has been well known and which has been in general practice for many years. This method of delivering glass is subject to certain disadvantages. As the glass flows from the furnace through the flow spout to the flow orifice it forms a natural channel of hot glass, and the glass farthest removed from the channel tends to remain stagnant and is comparatively cool. This cooler glass does not flow as readily as the hotter and more fluid glass, and yet a measurable percentage of the cooler glass flows with each charge or gob of hot glass, and consequently when the plunger is reciprocated a charge of unequal temperature throughout is delivered.

Further, the reciprocable plunger is arranged in the channel of hot flowing glass, and the result is that the side of the plunger facing the hot stream is heated to a higher temperature than its opposite side and this also tends to give an uneven temperature to the delivered charges.

The effect of a charge having these characteristics is not very appreciable where the articles are subjected to pressing alone in the process of manufacture, as the pressing plunger and mold are sufficiently rigid to control the uniformity of thickness between the pressing plunger and the interior of the mold.

But in the case of pressed and blown ware any lack of uniformity of temperature of the delivered charge produces a very deleterious effect on the finished ware. This is because the difference in temperature in the pressed blank, even though it is pressed to uniform thickness, causes different parts of the blank to offer different resistance to the distending influence of the air which is admitted to the interior of the blank under pressure, and consequently the wall of the finished article is of varying thickness.

The object of the present invention is to overcome the disadvantages mentioned above, and I will now proceed to describe the apparatus by which the objectionable features of the prior practice are entirely eliminated; reference being had to the accompanying drawings; in which, Figure 1 is an elevational view of the complete apparatus; the flow spout being shown in transverse section; and, Figure 2 is a horizontal sectional view of the apparatus, taken on line 2—2 of Figure 1.

Referring to the drawings more in detail, the flow spout, indicated by numeral 1, projects from a glass furnace (not shown) in the usual and well known manner. The flow spout is provided with the usual flow orifice 2, and removable bushing 3, through which flows the molten glass indicated by numeral 4. All of these parts are in common use in the glass art and form no part of the present invention, and consequently the foregoing brief description will suffice.

Referring now to that part of the apparatus in which the invention resides, numeral 5 indicates a cylinder which is carried by a bracket 6 clamped on a column 7 and supported by a collar 8 formed integral with the column; the column being preferably attached to and carried by the nose casing 9. It will be understood, of course, that the invention is in no way limited to the particular mounting of the column, and it is obvious that the cylinder could be mounted independently of the column if desired; and the particular structure described is therefore to be considered in an illustrative rather than in a limiting sense.

Cylinder 5 is provided with a piston rod 10 which is operated by the admission and exhaust of fluid pressure to opposite ends of the cylinder; the admission and exhaust of the fluid pressure being synchronous with the operation of the valves of a glass blowing or pressing machine in any conventional manner. Such valve operating means are well known, and as an understanding thereof is not necessary to an understanding of the present invention, it has been deemed advisable not to illustrate the same.

A support 11 is provided on the lower end of the piston rod, and this support functions as a ball-bearing race for the ball-bearings 12. Numeral 13 indicates a rotatable rod provided with a sleeve 14 at its upper end which fits over the ball-bearings 12, thereby anti-frictionally supporting the rotatable rod 13. This rod passes downwardly through a bracket 15 clamped to the column 7.

Mounted on the lower end of the rotatable rod is the usual plug or plunger 16. The plug may be attached to the rod in a great variety of ways, but I have devised an extremely simple device by which the plugs may be mounted and removed with the greatest ease and rapidity. A V-shaped socket member 17 is attached to or formed integral with the lower end of the rod 13, and a pin 18 is adapted to project through this socket member into a hole provided in the plug; the construction being clearly illustrated in Figure 1. Mounted on the rotatable rod, opposite to the socket member, is a clamp 19, which is preferably held in place by a screw 20. To remove the plug it is apparent that it is only necessary to release the clamp, whereupon the plug may be removed from the pin 18. To mount another plug in place it is only necessary to place the plug on the pin 18 and move the clamp 19 to operative position. The socket member 17 has been described as V-shaped, but it will be understood that the socekt may be of any shape desired.

Thus far I have described the means by which the plug is reciprocated, and the means by which the plug is attached to the reciprocable member, and I shall now describe the means by which the plug is rotated while it is being reciprocated.

The bracket 15, hereinbefore mentioned, has an extension shelf 21, on which is mounted the motor 22. The motor shaft 23 carries a worm 24 which engages and drives the worm wheel 25 keyed to the shaft 26. This shaft extends through bearings 27, 28 and has a worm 29 mounted on the end thereof, which engages with and drives a worm wheel 30. The worm wheel 30 is provided with a key 31 slidably mounted in the keyway 32 in the rotatable rod 13, the worm wheel being held against reciprocable movement by means of the fork 15' on the bracket 15. The rod 13 is thus free to be reciprocated by the cylinder, and at the same time the rod is continuously rotated by means of its sliding engagement with the worm wheel 30.

The operation of the apparatus will now be briefly described.

As the plunger 16 descends the glass will flow through the flow hole and at the proper moment the stream will be sheared and the severed glass gob will be delivered to an intermittent or continuously rotating glass machine such as are used for pressing, pressing and blowing, or blowing.

As the plunger ascends the unsevered portion of glass adhering thereto is drawn up into the mass of glass in the flow spout, and as it is drawn upwardly into the mass it is caused to rotate by the continuous rotation of the plug; and as a result of this rotation the unsevered portion is more intimately mixed with the glass mass in the flow spout thereby producing a uniform temperature.

Further, as hereinbefore stated, the flowing glass in the flow spout forms a natural channel of hot glass, while the glass farthest removed from the channel is relatively cool, and because it is cooler it is less fluid and tends to stagnate, and this tendency to stagnate is further increased by the glass adhering to the walls of the flow spout. A portion of this cooler glass mixed with the hot glass in the channel, and consequently in the former use of the simple reciprocating plug the delivered charges were not of uniform temperature. By the use of the reciprocating and rotating plug disclosed herein this lack of uniformity of temperature is wholly eliminated, for as the plug rotates the glass adheres thereto and consequently the glass is drawn from the channel and from the cooler sides and is throughly mixed into a mass of uniform temperature before it is discharged.

Further, by the continuous rotation of the plug, the plug itself is maintained at a uniform temperature, for all parts of the plug are presented successively to the parts of the glass mass having different temperatures, while in the former practice with a simple reciprocating plug, one side of the plug would always be presented to the hotter portion of glass, and the other side would always be presented to the cooler portion of glass.

A bracket 33 is slidably mounted on the column 7, and the outer end of said bracket embraces the piston rod 10; and obviously by vertically adjusting the bracket the upper limit of the plunger stroke is varied. The vertical adjustment of the bracket is accomplished by means of a vertical adjusting rod 34 which screw-threadedly engages the bracket as indicated by numeral 35, and which is operated by means of a handwheel 36. The adjusting rod 34, and bracket 33 carried thereby, are supoprted by means of collars 37, 37, attached to the rod 34 and arranged above and below another bracket 38.

The outer end of the bracket 38 embraces the rotary-reciprocating rod 13, below the sleeve 14, and hence this bracket functions to control the lower limit of the plunger 16. The bracket 38 is slidably mounted on the column 7, and is vertically adjustable thereon by means of an adjusting rod 39 screw-threadedly engaging the bracket as indicated by numeral 40, and which is operated by means of a hand wheel 41. The adjusting rod 39 is supported by means of a collar 42 which rests on a lug 43 secured to the nose casing.

As the bracket 33 is supported by the bracket 38, due to the collars 37 engaging the latter bracket, and as the bracket 38 is supported by means of the collar 42 resting on the nose casing lug 43, it is apparent that any movement given to the hand wheel 41 will either raise or lower the brackets 33 and 38 simultaneously and to the same amount, and hence the upper and lower limits of the plunger stroke will be varied, but the length of the plunger stroke will remain the same. If, however, it is desired to vary the length of the plunger stroke, the hand wheel 36 on the rod 34 may be operated as required to either raise or lower the bracket 33 relative to the bracket 38, thus either increasing or decreasing the length of the plunger stroke by increasing or decreasing the vertical movement of the rotary-reciprocating rod 13 in the space between the brackets 33 and 38.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

Having fully described the invention, what I claim as new and desire to secure by Letters Patent is:

1. An apparatus for delivering glass, including a flow spout having a flow orifice, a reciprocable plunger in vertical alignment with the flow orifice, a piston and piston rod for operating the plunger and arranged in vertical alignment therewith, a rotary rod carried by the piston rod, said plunger attached to the rotary rod, a worm wheel keyed to said rotary rod and having sliding movement thereon, a worm engaging said worm wheel and an electric motor for operating said worm.

2. An apparatus for delivering glass, including a reciprocable plunger, a cylinder and piston rod for operating the plunger, a sleeve forming a shoulder arranged between the plunger and its operating cylinder, and an adjustable bracket arranged above the sleeve and an adjustable bracket arranged below the sleeve, for varying the upper and lower limits of the plunger stroke.

3. An apparatus for delivering glass, including a reciprocable plunger, a cylinder and piston rod for operating the plunger, a rotary rod having a sleeve forming a shoulder mounted for rotary movement on the piston rod, said plunger carried by said rotary rod, an adjustable bracket arranged above the shoulder and an adjustable bracket arranged below said shoulder, to vary the limits of the plunger stroke, and means for rotating said plunger.

4. An apparatus for delivering glass, including a reciprocable plunger, a cylinder and piston rod for operating the plunger, a shoulder arranged between the plunger and cylinder, an adjustable bracket arranged above the shoulder and an adjustable bracket arranged below the shoulder, and means for adjusting said brackets simultaneously or independently.

5. An apparatus for delivering glass, including a reciprocable plunger, a cylinder and piston rod for operating the plunger, a rotary rod having a sleeve forming a shoulder mounted for rotary movement on the piston rod, said plunger mounted on said rotary rod, means for rotating said rod, a bracket arranged above the shoulder and a bracket arranged below said shoulder, and means for adjusting said brackets simultaneously or independently.

6. An apparatus for delivering glass, including a plunger, a cylinder and piston rod for reciprocating the plunger, means for rotating the plunger, a shoulder arranged between the plunger and its operating cylinder, a bracket arranged above the shoulder and a bracket arranged below the shoulder, a rod screw-threadedly engaging the upper bracket for adjusting it independently of the lower bracket, and a rod screw-threadedly engaging the lower bracket for adjusting the two brackets simultaneously.

7. An apparatus for delivering glass, including a plunger, a cylinder and piston rod for reciprocating the plunger, means for rotating the plunger, a shoulder arranged between the plunger and its operating cylinder, a column, brackets adjustably mounted on said column and arranged above and below said shoulder, an adjusting rod screw-threadedly engaging the upper bracket, said adjusting rod being supported by the lower bracket, and an adjusting rod screw-threadedly engaging the lower bracket, whereby the brackets may be adjusted simultaneously or independently.

8. An apparatus for delivering glass, including a reciprocable plunger and means for mounting said plunger, said means comprising a socket member, said socket member and plunger having registering apertures, a pin adapted to be inserted in the registering apertures, and a movable clamp adapted to engage the opposite side of the plunger.

9. An apparatus for delivering glass, including a reciprocable plunger and means for mounting said plunger, said means including a pin on which the plunger is hung, and a movable clamp for holding the plunger on said pin.

10. An apparatus for delivering glass, including a reciprocable plunger and means for mounting said plunger, said means including an open-sided socket member, a pin projecting laterally from said socket member, the plunger adapted to be hung on said pin, and a movable clamp adapted to engage the side of the plunger opposite to the socket member.

11. An apparatus for delivering glass including a reciprocable plunger, two elements for limiting the up and down stroke of the plunger, an adjustable connection between the two elements, and a screw-threaded rod engaging one of said elements for simultaneously adjusting the two elements.

12. An apparatus for delivering glass including a reciprocable plunger, a column, two brackets slidably mounted on said column and limiting the plunger stroke, an adjusting rod screw-threadedly engaging one of said brackets and supported by the other bracket, and an adjusting rod screw-threadedly connected with said other bracket.

13. An apparatus for delivering glass including a reciprocable plunger, a cylinder and piston arranged in vertical alignment with the plunger and operatively connected therewith, means for rotating said plunger, stop members for varying the limits of the plunger stroke, and an adjustable connection between said members.

14. An apparatus for delivering glass including a reciprocable plunger, a cylinder and piston arranged in vertical alignment with the plunger and operatively connected therewith, means for rotating the plunger, stop members for varying the limits of the plunger stroke, and means for simultaneously adjusting said stop members.

15. An apparatus for delivering glass including a reciprocable plunger, a cylinder and piston arranged in vertical alignment with the plunger and operatively connected therewith, means for rotating the plunger, stop members for varying the limits of the plunger stroke, means for simultanenously adjusting said stop members, and means for independently adjusting one of said stop members.

16. A glass feeder including a plunger, a cylinder for reciprocating said plunger, a pair of arms which project into vertical alignment with the plunger to limit the stroke thereof, and means for simultaneously adjusting said arms vertically.

17. A glass feeder including a plunger, a cylinder for reciprocating said plunger, a pair of arms which project into vertical alignment with the plunger to limit the stroke thereof, and means for adjusting said arms vertically, either simultaneously or independently.

18. A glass feeder including a plunger, a cylinder for reciprocating said plunger, a pair of arms which project into vertical alignment with the plunger, and means for moving said arms simultaneously the same distance in the same direction or moving said arms relatively.

DAVID STENHOUSE.